United States Patent
Flury et al.

[11] 3,797,724
[45] Mar. 19, 1974

[54] SOLDERING APPLIANCE

[75] Inventors: Karl Flury, Dietikon; Rolf Zitt, Dubendorf, both of Switzerland

[73] Assignee: Kurt Schleumiger, Nennigkofen, Switzerland

[22] Filed: Oct. 18, 1971

[21] Appl. No.: 190,241

[30] Foreign Application Priority Data
Oct. 20, 1970 Switzerland.................. 15442/70
Oct. 27, 1970 Switzerland.................. 15921/70
Sept. 6, 1971 Switzerland.................. 13065/71

[52] U.S. Cl.................. 228/37, 29/471.1, 29/484, 29/503, 118/400, 228/40
[51] Int. Cl................................. B23k 1/08
[58] Field of Search........ 228/36, 37, 38, 40; 13/26; 29/471.1, 484, 490, 503; 117/113, 114; 118/259, 400

[56] References Cited
UNITED STATES PATENTS
3,685,715  8/1972  Perrin .............................. 228/37
3,084,650  4/1963  Johns .............................. 228/37 X
2,539,800  1/1951  Tama .............................. 13/29
2,539,215  1/1951  Weil et al. ........................ 13/29
1,834,725  12/1931 Northrup ......................... 13/26
1,646,862  10/1927 Hoskins ........................... 13/26

Primary Examiner—J. Spencer Overholser
Assistant Examiner—Robert J. Craig
Attorney, Agent, or Firm—Kurt Kelman

[57] ABSTRACT

The disclosure relates to a soldering apparatus including a solder receptacle in communication with a pumping zone. A field magnet generates a magnetic field within a pumping zone while a current feed is passed through solder transversely the direction of the magnetic field. The combined action of the magnetic field and the current produces a force in the pumping zone which acts directly on the solder for movement in a given direction. The present apparatus is especially useful for trouble-free soldering of printed circuit boards.

23 Claims, 11 Drawing Figures

PATENTED MAR 19 1974 3,797,724

SOLDERING APPLIANCE

The present invention concerns a soldering appliance having a receptacle for a tin bath and in particular designed to solder printed circuits.

Various attempts have been made to provide a soldering appliance having a receptacle for a tin bath and to melt the tin with the aid of electricity and put the molten tin into circulation, i.e. produce a pumping effect. For this, recourse was had to the known fact that two conductors carrying opposed currents repel each other. Thus, when one of the conductors is fixed and the other is movable, forming part of the tin bath, for instance, the mutually repelling fields of force will cause the tin two move away. As this experiment involves magnetic fields in air, which normally lose in intensity with the square of distance, it is essential that the tin bath should be arranged as near the primary coil as possible. As a result, however, the temperature of the tin bath, which is about 250°C in normal operating conditions, besides the self-heating of the primary coil, raises the temperature of the coil to a level which is unpermissible for its practical operation. Insulation of the coil by increasing the distance or thermal insulation is out of the question, as this would reduce the efficiency of the system with the square of the distance or the thickness of the insulating layer and thus render it inadequate. Such a system is yet further inadequate because the heating of the tin bath in which a pumping channel is arranged requires a current directed across the pumping channel. And to develop a sufficient pumping action, that current would have to be so high that the operating temperature of the tin bath in a practical model would be over 400°C. Owing to this basic connection between heating and pumping effect, it is impossible to regulate the temperature of the tin bath without concurrently influencing the pumping head. But as it is known from practice that such solder baths must not have temperature differences exceeding ± 3°C or, better, 1°C, such a connection for solving the particular problem is unsatisfactory and practically not feasible.

Another drawback of such a soldering appliance is that the secondary winding consists of a short-circuit bow of copper which is in direct contact with the solder tin. As is known, however, molten tin is capable of combining with copper. This entails two disadvantages: First, the tin-lead solder alloy gradually acquires a copper component which eventually renders the alloy unsuitable for soldering; secondly, especially at the excessive temperatures arising in the solder bath for the reasons previously mentioned, the copper is very rapidly corroded so that ultimately the whole system becomes leaky.

Yet another drawback of the appliance is that the upward discharge of tin in many thin jets through the air results in sharply increased oxidation, which is yet further promoted by the disproportionately high operating temperatures, resulting in considerable coatings of dross and tin oxide, which are then returned through the intake channel into the pumping system and clog the nozzles. Owing to the combination of pumping action and heating, the pumping system cannot be stopped between two soldering jabs, because stopping the pump also cuts off the heating, so that, during prolonged interruptions, the bath would cool down unduly and get out of control in terms of temperature.

Again, it has been found that the sharp shrinkage of the tin in cooling can cause the tin to detach itself from the short-circuit U-bow on one side or both. In that case, the tin can only be melted by an external heat source, such as a gas burner, which must melt the tin until it makes contact again and closes the heating circuit.

The object of the present invention is to provide a soldering appliance which is free of the aforesaid drawbacks and which permits the pumping head to be varied practically independently of the heating, and vice versa.

Accordingly, the soldering appliance claimed hereunder is characterized in that it comprises electrical and magnetic means designed to produce a pumping effect on molten tin by a magnetic field pervading the tin and by an electric conductor which pervades the said field at right angles and which consists of part of the tin bath.

Experiments have shown that it is advantageous for the purpose of optimizing the pumping effect within the scope of the present invention either to arrange a phase shifter in the magnetic field circuit or in the current coil circuit, or to provide means permitting the appliance to be connected to alternating current of at least two phases.

Embodiments of the present invention are now to be described by way of example with reference to the accompanying drawings, in which.

Figure 1:
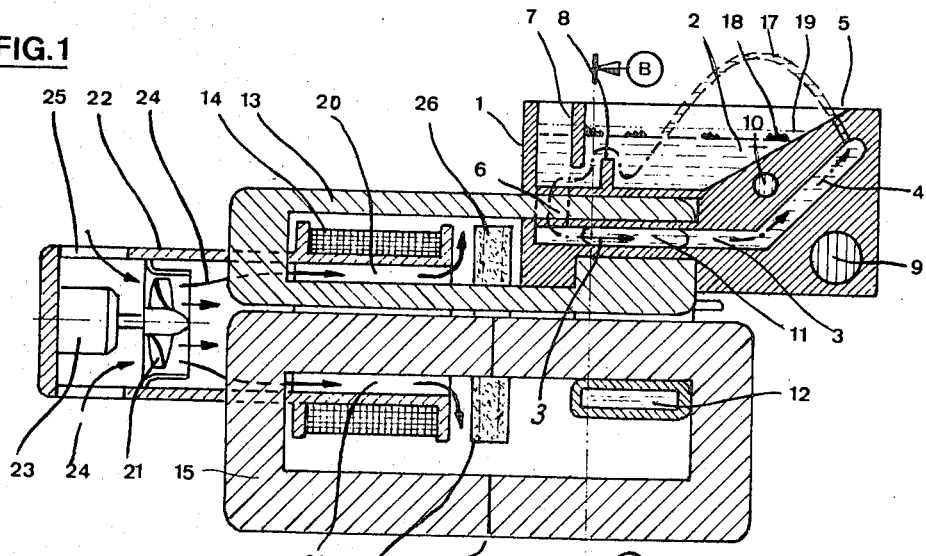
FIG. 1 shows a section through a soldering appliance in the axial direction of the primary coil and through the tin bath along line A—A of FIG. 2.
Figure 3:
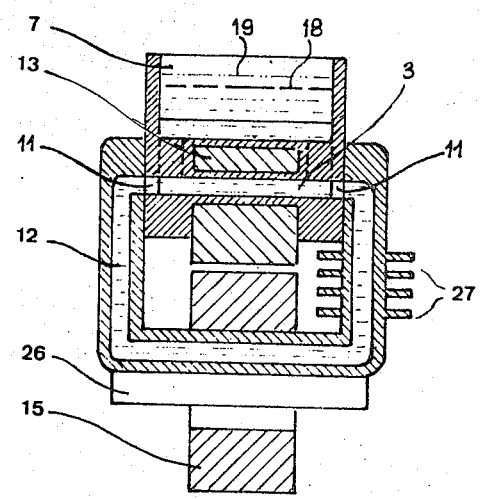
FIG. 3 shows a section through the soldering appliance along line B—B of FIG. 1.

The embodiment shown in FIG. 1 comprises a receptacle 1 with tank 2, a pumping channel 3 which extends substantially horizontally below the tank 2, and upward sloping channel 4, a nozzle assembly with several parallel bores 5, and two return channels 6. If further comprises a yoke 13 ending below and above the channel 3. The channel 3 has lateral apertures 11 communicating with each other through a ring channel 12, as shown more clearly in FIG. 3. This ring channel 12 forms a short-circuit secondary winding in the system now to be described. The winding consists essentially of tin, thus avoiding any problems of contact between a yoke consisting of some other metal (instead of the ring channel 12) and the tin bath. The ring channel case is made of steel or the like, for instance. This has the advantage that no foreign metal can dissolve in the tin, as steel is known to be insoluble in molten tin. The current passing through the ring channel case can be disregarded in terms of heating, as the heat developed by the electric current is easily transferred from the iron or steel case to the tin. The yoke 13 and an annular core 15 extend through a primary coil 14 (FIG. 1). The annular core 15 couples the primary coil 14 to the short-circuit secondary winding 3, 11, 12. In operation, the primary coil 14, carrying current, induces a corresponding current in the short-circuit winding.

Between the free ends of the yoke 13, there arises a magnetic field pervading the pumping channel and the contents thereof. As is known, a force is exerted on a current-carrying conductor pervaded at right angles by a magnetic field. Accordingly, the movable current-carrying conductor, i.e. the tin, being influenced by the prevailing current direction and the magnetic field, moves in the pumping channel 3 to the right (FIG. 1).

The core 15 presents a variable air gap 16 permitting the coupling ratio between primary and secondary to be varied. Increasing the air gap 16 reduces the current induced in the short-circuit winding and, accordingly, the heating effect on the tin bath. At the same time, it increases the magnetic flux in the yoke 13, so that the pumping force can remain constant. It is thus possible, with the pumping head approximately constant and only variable by the input at the primary coil, to regulate the ratio between magnetic field and current in such a manner that the operating temperature of the bath cannot be developed by the heating effect of this current alone, because in this system the pumping action depends on two factors, viz. the magnetic field and the current. It is therefore possible to obtain the same pumping head either by a high current and a weak magnetic field, though this would result in overheating the tin, or then by a strong magnetic field and low current, which would also ensure an adequate pumping head, but would no longer be sufficient to reach the operating temperature of the tin. It is now possible by means of an additional ordinary electric resistance heating using a thermostat to reach the bath temperature and keep it constant in a very simple manner, regardless of the pumping head.

Another device is to dimension the electric heating in such a manner that it alone is capable of maintaining the bath operating temperature and that the pumping need only be started when a printed circuit is passed over the nozzles for the purpose of soldering. This brief switch-on which can be combined with cut-off of the resistance heating or can be controlled by thermostat with a small delay, has practically no influence on the bath temperature. It is thus possible to adjust the pumping effect to requirements without any risk of overheating the tin.

Provided for the purpose of reaching the operating temperature and keeping it constant is an additional heating 9, which can be controlled to ON and OFF or progressively by known devices (not shown) in conjunction with a temperature probe 10.

A baffle 7 prevents oxides on the bath surface from floating back into the return channel 6. To prevent the tin jets returning into the tin bath from sweeping impurities under the baffle 7 and into the channel 6 and thus considerably increasing the risk of clogging of the nozzles 5, the tank floor presents a baffle 8 which deflects the returning tin into an upward direction and also propels upwards any oxide remainders shot into the bath by the tin jets; the oxide remainders are then caught by the baffle 7.

Figure 2:
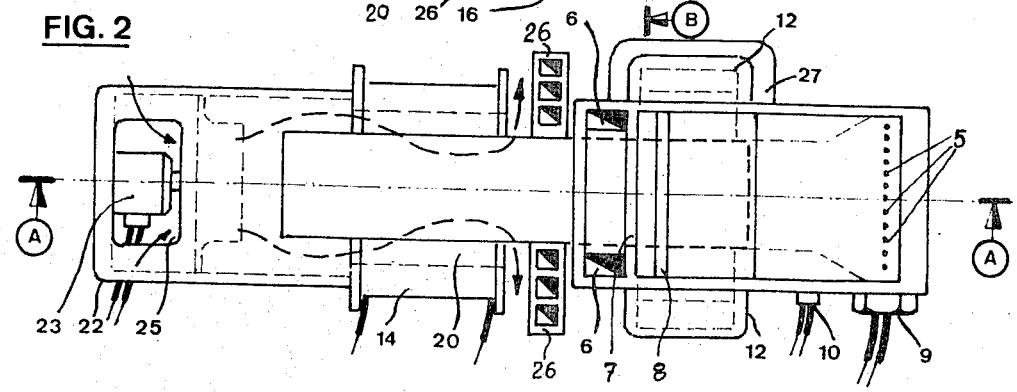
FIG. 2 shows a top view of the soldering appliance according to FIG. 1.

To prevent overheating of the primary coil 14, the system further comprises a substantially annular air gap 20 and a blower 21 in a duct 22. The blower 21 is driven by a motor 23. Air is drawn from outside through lateral apertures 25 and then propelled as an air stream 24 into the space between the coil 14 and the yoke-core assembly 13, 15. Also provided is a heat insulation 26 which consists of a temperature-resistant thermal insulant, such as ceramic, and presents vertical air ducts, as shown in FIG. 2. These air ducts give rise to an automatic thermally developed air flow assisting the cooling effect. One of the vertical sides of the ring channel 21 presents several cooling fins 27 for the purpose of slowly yet continuously mixing the tin present in the ring channel with the tin remaining in the tank 2. The temperature of the tin ring is somewhat lower in that part of the ring channel 12 than on the opposite side, so that here again a thermally developed flow arises. The receptacle in this embodiment consists of a magnetically non-conductive and electrically insulating material, such as hard-anodized aluminium, ceramic or some other magnetically non-conductive material insulated by stove-enamelling.

For the purpose of soldering printed circuits, the first step is to switch on the heating 9 to melt the tin in the receptacle 1. The blower 21, meanwhile also switched on, cools the coil 14. The air gap 16 is set accordingly. As soon as the tin reaches the temperature required, the appliance is ready for operation. The primary coil 14 is switched on. The magnetic field pervading the pumping channel 3 repels the current-carrying tin in the channel 3 in the direction of the arrows and forces it through the nozzles 5, whence the tin jets 17 shoot out and dip into the bath in the form of a trajectory parabola.

The circuit board to be soldered is passed in a plane riding the surface of the tin jets, so that the molten tin completely sweeps the underside of the board. The points to be soldered are soldered, while the surplus tin, repelled by the other parts, falls into the bath. When the soldering work is done, the pumping action is stopped by cutting off the current to the coil 14, while the bath temperature is kept nearly constant by the heating 9 controlled by the thermostat 10. Owing to the additional heating, the soldering appliance remains ready for operation at any time.

Figure 4:
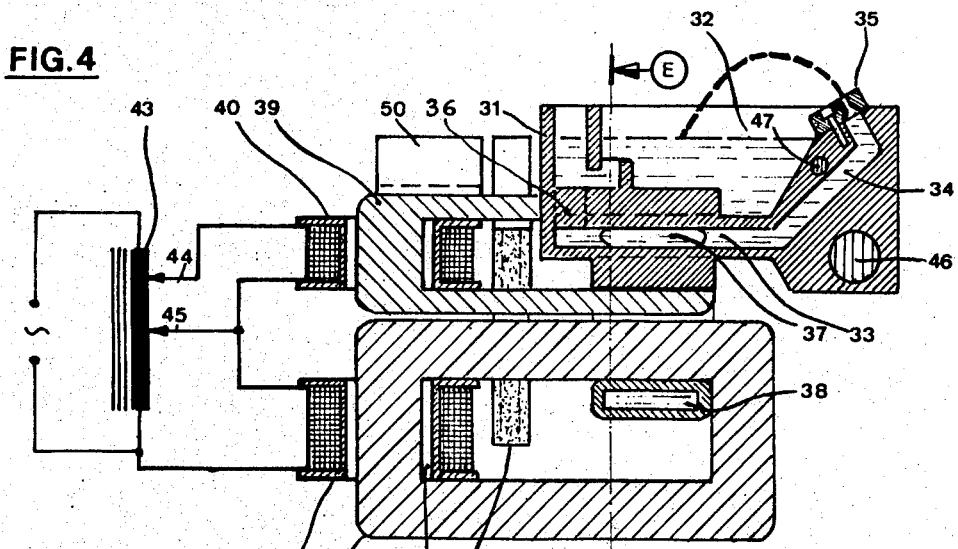
FIG. 4 shows another embodiment of a soldering appliance revealed as in FIG. 1 and cut along line D—D of FIG. 5.
Figure 5:
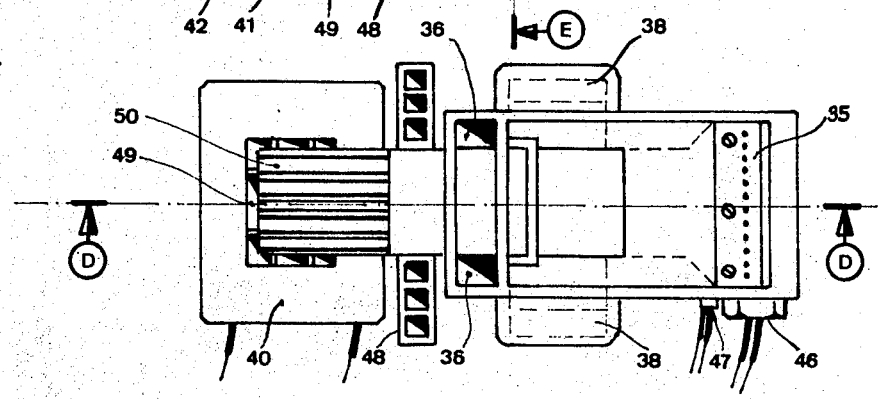
FIG. 5 shows a top view of the soldering appliance according to FIG. 4.
Figure 6:
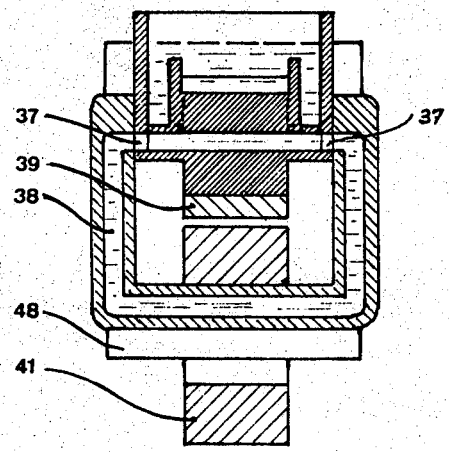
FIG. 6 shows a section through the soldering appliance according to FIG. 4 along line E—E.

The embodiment shown in FIGS. 4 to 6 differs from the foregoing version chiefly in that the receptacle 31 with the tank 32 consists of a material which is magnetically conductive but electrically as poorly conductive as possible, such as cast iron. This version further comprises a pumping channel 33 and a communicating channel 34 leading to a nozzle assembly 35, and two return channels 36 with lateral apertures 37, and a ring channel 38. To increase the electric insulation, cast iron, after machining, can be subjected to heat treatment to produce casting skin. The insulation can be yet further improved by subsequently stove-enamelling the finished cast-iron receptacle.

In contrast with the first version, the magnetic yoke 39 and the iron core 41 in this embodiment are provided with separate coils 40 and 42. The iron core 41 has no air gap. The pumping head is regulated by adjusting a tap 44 on a regulating transformer 43, while the ratio between magnetic field strength and current can be varied by adjusting a tap 45. According as the current increases, the magnetic field strength diminishes, and vice versa. However, varying the pumping head by adjusting the tap 44 inevitably alters the heating effect. It is therefore necessary here again to provide an additional heating 46 controlled by a thermostat 47. The system further comprises a heat insulation 48 and cooling ducts 49 and cooling fins 50. For the rest, the construction is analogous to that shown in FIGS. 1 to 3.

Yet another embodiment, different considerably from the two described above, is shown in FIGS. 7 to 10. The receptacle 51 with the tank 52 and the puming channel 53 again consists of magnetically conductive material, preferably cast iron with a major silicon constituent. The magnetic field is in this case produced by two permanent magnets 54 and 55 interconnected by a magnetic bridge 56. This magnetic bridge 56 is an integral part of the receptable 51. For the rest, the construction of the receptacle 51 is governed by the same considerations as to thin-cross-sections and great lengths at the points where no current or magnetic flux is desirable. The current which is to be passed across the tin system with the lateral apertures 57 of the receptacle 51 is in this case generated in a U-shaped yoke 58 which is preferably made of copper and which is conductively connected to the tin bath by contact pieces 62. These contact pieces 62 are made of a material insoluble in molten tin, such as iron. To prevent the tin in the pumping channel 53 from detaching itself by shrinking from the contact pieces 62 when the bath cools, these pieces are T-shaped, with a nose-like projection, and present either an outward taper or flukes, for instance. This projection protrudes into the pumping channel 53 and ensures contact even when the cooling tin shrinks. The current in the secondary (yoke 58) is induced by the primary coil 60 by means of an iron core 59. But as the magnetic field in the pumping channel 53 is constant, owing to the magnets 54 and 55, and not alternating, it is necessary to generate unidirectional current impulses in the short-circuit winding, represented by the yoke 58.

The nozzle assembly 63 is somewhat different in that the bores 65 are interconnected at their upper ends by a slot 64. The tin forced through the bores 65 is flattened out in the slot 64, so that flat, approximately fanwise arranged tin jets are shot out upwards and then unite into a film. This film has the advantage that it, unlike separate jets, removes the risk of some points on the printed circuit remaining untouched. This is the more important as it has been observed that individual jets may issue obliquely owing to dirt in the nozzles and then unite with an adjacent jet into a thicker jet, with the result that considerable gaps may arise between two such bundled jets.

This embodiment again comprises an electric heating 66, controlled by a thermostat 67.

To prevent tin oxidation, it is possible, as shown in FIG. 1, to cover the tin bath itself with an oil layer 19. The oil should be of a type which does not decompose at the operating temperature of the bath, which is about 250°C, such as silicone oil. To prevent oxidation of the tin jets shooting through the air, the oil level can be raised so high that the tin jets issue below the surface of the oil layer. The tin jets are thus coated with an oil film. For this, however, it is necessary to use a so-called soldering oil, which, while preventing oxidation by excluding the air, still does not interfere with the soldering on the copper layer of the printed circuit. Such oils have been in use for some time in the ordinary wave or flood soldering machine.

In the embodiment according to FIG. 1, the pumping action is started and stopped by switching primary coil 14 on and off. During interruptions of work, the heating 9 keeps the bath temperature constant.

In the embodiment shown in FIG. 4, it is sufficient to switch the coil 40 on and off, while the coil 42 in conjunction with the additional heating 46 keeps the bath temperature constant.

Figure 7:
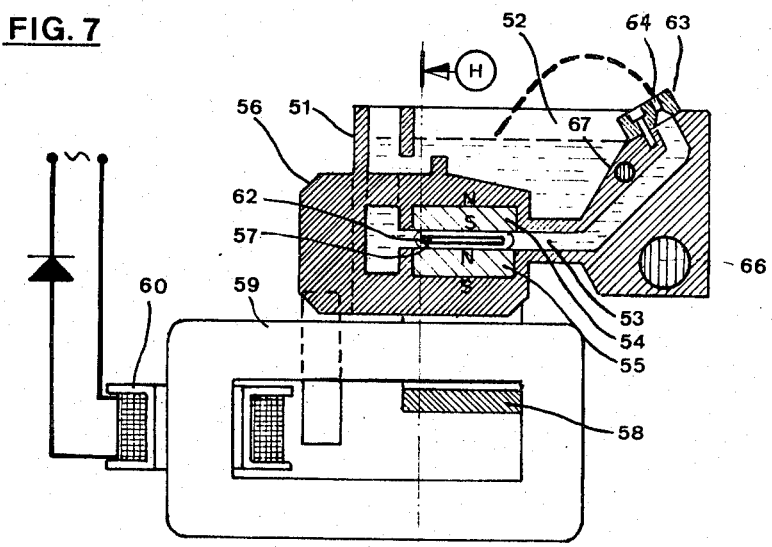
FIG. 7 shows a variant of the embodiment according to FIG. 1; cut along line G—G of FIG. 8.

In the embodiment according to FIG. 7, switching on and off is effected by switching of the current in the coil 60. Here, the heating 66 ensures maintenance of the bath temperature.

Figure 8:
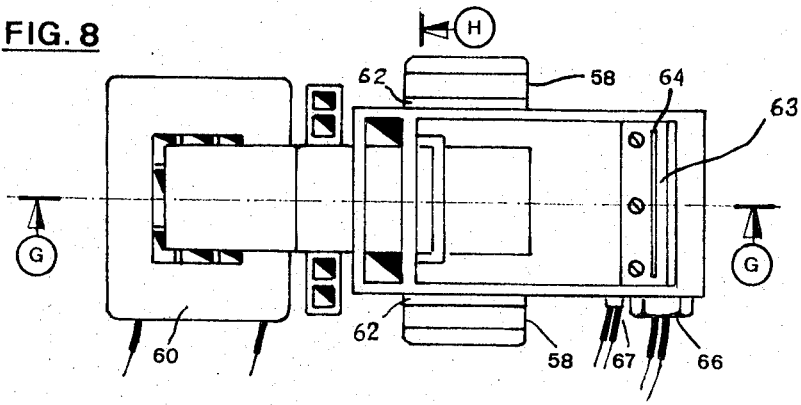
FIG. 8 shows a top view of the soldering appliance according to FIG. 7.
Figure 9:
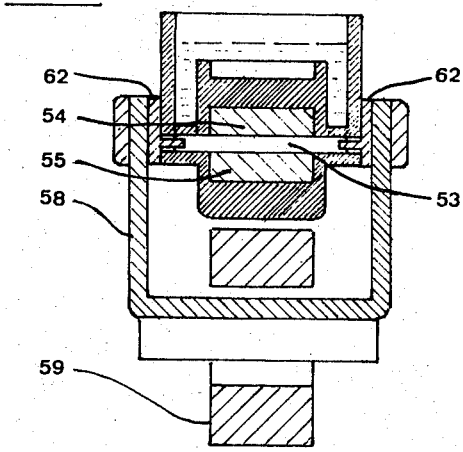
FIG. 9 shows a section through the soldering appliance along line H—H of FIG. 7.
Figure 10:
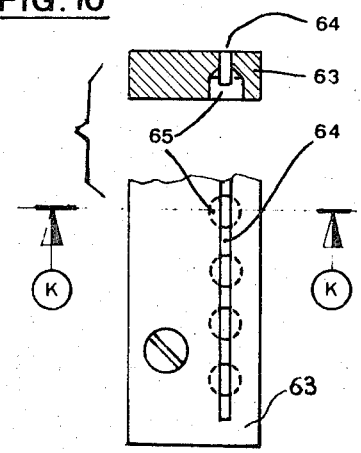
FIG. 10 shows part of the nozzle assembly viewed from above and cut along line K—K.

It is of course also possible to combine the short-circuit winding according to FIG. 9 with the baths according to FIG. 4 or FIG. 1. The same applies to the nozzle assembly according to FIG. 10. Another advantage of using a cast-iron receptacle (FIGS. 4 to 9) is that the magnet gap in the pumping channel can be built up without any disturbing, i.e. magnetically non-conductive, intermediate layers, so that an optimal degree of efficiency is attained, in contrast with the aluminium receptacle according to FIG. 1, where an intermediate layer is indispensable mainly in order to keep the bath tight with respect to the magnetic yoke extending through it. And this involves an additional loss in the magnetic path. The same would apply to the arrangement shown in FIG. 9 if the permanent magnets 54, 55 were not in direct contact with the tin to be pumped.

It would also be possible in the embodiment according to FIGS. 7 to 9 to arrange a magnet in the yoke 56 and design the two poles 54 and 55 according to FIG. 4. Moreover, it might be necessary to arrange a blower such as that in FIGS. 1 and 2 in the systems according to FIG. 4 or 7, as the flow cooling by convection alone may not be sufficient, at any rate in the system according to FIG. 4. In the system shown in FIG. 7, the cooling by natural air circulation may be presumed to be sufficient.

Instead of regulating the pumping head by the tap 44 shown in FIG. 4, it is possible to control the control circuit by a thyristor circuit by phase angle. Such a control system could be used for the automatic maintenance of the pumping head, with a suitable circuit automatically offsetting mains voltage fluctuations. In addition, a low-frequency alternating voltage, e.g. of the order 1 to 5 c/s, could be superimposed on the control voltage defining the phase angle point, with the effect of producing a vertically oscillating pumped jet which would result, as it were, in a mixed movement of the tin on the underside of the printed circuit. This device would also be feasible for the versions according to FIGS. 1 and 7.

The appliances described can basically be used to melt and circulate metals and their alloys with melting points below about 400°C. Such appliances require only little power, as there is no need for cooling the tin bath in order to prevent overheating. The particular components such as coils, cores, heating, etc., can therefore be made small, ultimately resulting in an inexpensive, light, overload-proof and highly dependable unit. such a unit is also easy to clean, especially in the nozzle zone, as the nozzle assemblies 35 and 63 can be removed from outside, even when the metal bath is molten.

Figure 11:
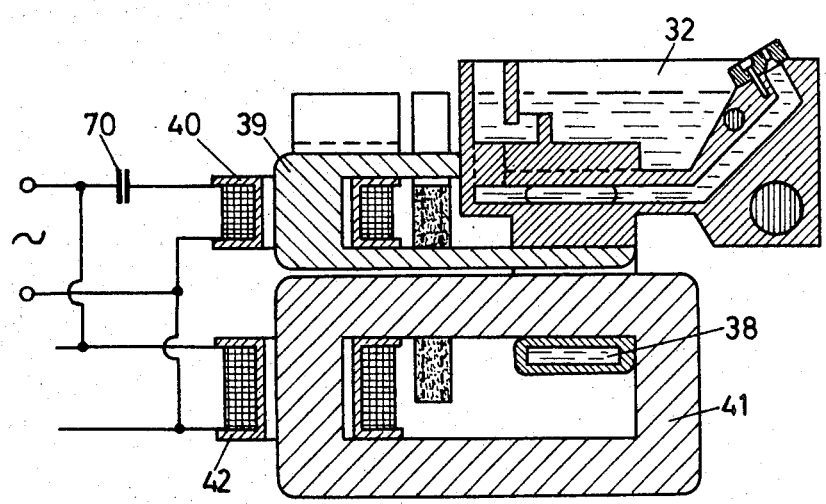
FIG. 11 shows part of a soldering appliance according to FIG. 4, with the circuitry added.

In analogy to FIG. 4, FIG. 11 shows a ring channel 38 of a receptacle 32, a magnetic yoke 39 with a field coil 40, and an iron core 41 with a current coil 42.

In this system, fed with alternating current, the supply circuit of the field coil 40 is provided with a phase shifter in the form of a capacitor 70 which permits optimal operating conditions to be obtained economically, with minimal reactive power. This capacitor 70 permits the circuit of the field coil 40 to be brought into resonance with the mains frequency where necessary.

Instead, however, it is possible to provide the current coil 42 with such a phase shifter, as in the form of a capacitor, and bring it into resonance with the mains frequency where necessary. In this case, the field coil 40 is connected directly to the supply mains.

Again, it is possible to use phase shifters of another type, such as a choke coil or some other device known to the industry.

This device permits pumping efficiency to be appreciably improved. It reduces dissipation heat in the system and resulty in less influence on the bath temperature controller.

It is also possible to operate the appliance with a better pumping effect directly from an alternating current mains of at least two phases, without requiring a special phase shifter in the soldering appliance.

We claim:

1. A soldering apparatus which comprises in combination, a receptacle having a tank containing solder, a channel in communication with said tank and disposed for circulating the solder, electric means and magnetic means disposed relative said channel for producing a pumping effect on molten solder, said electric means providing an electric field at right angles relative a magnetic field from the magnetic means, said magnetic means having a yoke with free ends, said free ends disposed relative to said channel on opposite sides thereof.

2. The soldering apparatus according to claim 1 wherein an iron yoke is included, said iron yoke having free ends extending at least partly into the receptacle.

3. The soldering apparatus according to claim 2 wherein said iron yoke includes two shanks, one of the shanks of said yoke extending into the tank floor, the other shank thereof extending into the receptacle base below the channel in such a manner that the said channel is located between the two free ends of the yoke.

4. The soldering apparatus according to claim 1 wherein a phase shifter is included in the magnetic field circuit.

5. The soldering apparatus according to claim 1 wherein a phase shifter is included in the circuit of the current coil.

6. The soldering apparatus according to claim 1 wherein means are provided for connecting the apparatus to alternating current of at least two phases whereby optimum pumping is effected.

7. The soldering apparatus according to claim 1 wherein the receptacle comprises a tank which is open at the top for receiving solder bath and which has a perforated floor, said channel being arranged below the tank floor in communication with the said perforations with nozzles near the open top of the tank.

8. The soldering apparatus according to claim 1 further comprising a primary coil through which extends a yoke having a U-shape, and supporting the receptacle and through which also extends a magnetic core, provided with a variable air gap.

9. The soldering apparatus according to claim 8 wherein a secondary conductor surrounds a yoke shank and the magnetic core and forms a hollow body which communicates through the channel with the tank in such a manner that in operation molten solder fills the interior thereof and acts as part of the secondary conductor.

10. The soldering apparatus according to claim 9 wherein the secondary conductor, which in operation carries molten tin, includes at least two approximately vertical limbs, one of which is cooled, as by cooling fins, in such a manner that a thermosiphon effect causes circulation of the molten solder in the secondary conductor.

11. The soldering apparatus according to claim 7 wherein the receptacle is provided with at least one barrier disposed to intercept impurities and thus prevent clogging of the channel and the nozzles communicating therewith.

12. The soldering apparatus according to claim 1 wherein the receptacle is made of a material selected from the group consisting of anodized aluminum, ceramic, magnetically non-conductive material insulated by stove-enameling, and magnetically conductive but electrically insulating material.

13. The soldering apparatus according to claim 1 further comprising a magnetic yoke and a magnetic core, each of which presents a controllable primary coil, the arrangement being such that the voltages can be tapped from a regulating transformer in a correlatively variable manner.

14. The soldering apparatus according to claim 1 further comprising an additional heating device disposed to keep the temperature of the molten solder bath constant.

15. The soldering apparatus according to claim 1 wherein a magnetic core is included with a primary coil and a single-winding secondary coil, said secondary coil having a U-shaped yoke configuration which surrounds the magnetic core and whose shanks are electrically interconnected with the solder.

16. The soldering apparatus according to claim 7 wherein a slotted nozzle is fed from the channel through apertures spaced along the slot and disposed for developing a flat jet.

17. The soldering apparatus according to claim 1 wherein permanent magnets are disposed to set up the magnetic field.

18. The soldering apparatus according to claim 7 wherein nozzles are removable even when the solder bath is molten.

19. The soldering apparatus according to claim 8 wherein there is arranged between the primary coil and the yoke-core assembly, an air gap for the purpose of cooling, with or without a blower.

20. The soldering apparatus according to claim 15 wherein the free ends of the yoke present projections whose jacket surfaces are touched by the solder.

21. The soldering apparatus according to claim 4 wherein the phase shifter is a capacitor.

22. The soldering apparatus according to claim 21 wherein the capacitor with an associated coil forms a resonant circuit with the main frequency.

23. The soldering apparatus according to claim 1 wherein the electric components in the form of at least one primary coil are action-connected to the magnetic components in the form of at least one secondary coil, the arrangement being such that the solder bath forms part of the conductor of the secondary coil in such a manner that the conductor pervades the solder-pervading magnetic field at right angles for the purpose of inducing a pumping effect on the molten solder.

* * * * *

UNITED STATES PATENT OFFICE
CERTIFICATE OF CORRECTION

Patent No. 3,797,724     Dated  Mar. 19, 1974

Inventor(s) Karl Flury et al

It is certified that error appears in the above-identified patent and that said Letters Patent are hereby corrected as shown below:

In Col. 1, at (73), change "Schleumiger" to --Schleuniger--.

Signed and sealed this 30th day of July 1974.

(SEAL)
Attest:

McCOY M. GIBSON, JR.
Attesting Officer

C. MARSHALL DANN
Commissioner of Patents